United States Patent
Kim et al.

(10) Patent No.: US 12,511,552 B2
(45) Date of Patent: Dec. 30, 2025

(54) SYSTEM AND METHOD FOR IDENTIFYING SUBSTITUTABLE ENTITIES IN PROCEDURAL INSTRUCTIONS

(71) Applicant: Robert Bosch GmbH, Stuttgart (DE)

(72) Inventors: HyeongSik Kim, San Jose, CA (US); Sola Shirai, Troy, NY (US)

(73) Assignee: Robert Bosch GmbH, Stuttgart (DE)

( * ) Notice: Subject to any disclaimer, the term of this patent is extended or adjusted under 35 U.S.C. 154(b) by 1047 days.

(21) Appl. No.: 17/555,411

(22) Filed: Dec. 18, 2021

(65) Prior Publication Data

US 2023/0196126 A1 Jun. 22, 2023

(51) Int. Cl.
*G06N 5/02* (2023.01)

(52) U.S. Cl.
CPC ..................... *G06N 5/02* (2013.01)

(58) Field of Classification Search
CPC ..................................... G06N 20/00
See application file for complete search history.

(56) References Cited

U.S. PATENT DOCUMENTS

| 11,093,223 | B2 * | 8/2021 | Rabinovitch | ............. | G06F 8/40 |
| 2013/0117204 | A1 * | 5/2013 | Vadlamani | ............. | G06N 5/022 706/54 |
| 2021/0058345 | A1 * | 2/2021 | Yoon | ....................... | H04L 51/02 |

OTHER PUBLICATIONS

Maeta, Hirokuni, Tetsuro Sasada, and Shinsuke Mori. "A framework for procedural text understanding." Proceedings of the 14th International Conference on Parsing Technologies. 2015. (Year: 2015).*
Wang, Quan, et al. "Knowledge graph embedding: A survey of approaches and applications." IEEE transactions on knowledge and data engineering 29.12 (2017): 2724-2743. (Year: 2017).*
Morales-Garzón, Andrea, Juan Gómez-Romero, and Maria J. Martin-Bautista. "A word embedding-based method for unsupervised adaptation of cooking recipes." IEEE Access 9 (2021): 27389-27404. (Year: 2021).*
Nasir, Abdur Rehman, and Hans-Joachim Bargstädt. "An approach to develop video tutorials for construction tasks." Procedia engineering 196 (2017): 1088-1097. (Year: 2017).*

(Continued)

*Primary Examiner* — Kevin W Figueroa
(74) *Attorney, Agent, or Firm* — Maginot, Moore & Beck LLP (57) ABSTRACT

A computer-implemented method for identifying substitutions for procedural instructions include parsing a procedural instruction to identify object-action tuples pertaining to the steps of the instruction, and generating a flow graph for the procedural instruction using the identified object-action tuples. The flow graph is then processed using a knowledge graph embedding model to calculate embeddings for the intermediate nodes and the result node, respectively, of the flow graph based on triples that include a head entity, a relation and a tail entity, wherein the head entity for a given intermediate nodes or the result node comprises an aggregation of the input nodes connected to the given intermediate node or the result node. A substitution for nodes in the flow graph may then be identified by calculating new embeddings for the result node based on the substitution and determining a similar between the original embeddings and the new embeddings.

9 Claims, 7 Drawing Sheets

(56) References Cited

OTHER PUBLICATIONS

Karikome, Shihono, Noriko Kando, and Tetsuji Satoh. "Structural analysis of procedural texts for generating flow graphs." Proceedings of the 19th International Conference on Information Integration and Web-based Applications & Services. 2017. (Year: 2017).*

Hamada et al., "Structural Analysis of Cooking Preparation Steps in Japanese", Proceedings of the 5th International Workshop Information Retrieval with Asian Languages, 2000, pp. 157-164, https://doi.org/10.1145/355214.355237 (8 pages).

Mori et al., "Flow Graph Corpus from Recipe Texts", Proceedings of the Ninth International Conference on Language Resources and Evaluation (LREC'14), 2014, pp. 2370-2377, http://www.lrec-conf.org/proceedings/lrec2014/pdf/763_Paper.pdf (8 pages).

Yamakata et al., "A Method for Extracting Major Workflow Composed of Ingredients, Tools, and Actions from Cooking Procedural Text" (6 pages).

Honnibal et al., "Industrial-Strength Natural Language Processing in Python", Webpage (10 pages).

Dooley et al., "FoodOn: a Harmonized Food Ontology to Increase Global Food Traceability, Quality Control and Data Integration", Article, Science of Food, 2018, pp. 1-9, vol. 2, Nature Partner Journals, https://doi.org/10.1038/s41538-018-0032-6 (10 pages).

Kiddon et al., "Mise en Place: Unsupervised Interpretation of Instructional Recipes", Proceedings of the 2015 Conference on Empirical Methods in Natural Language Processing, 2015, pp. 982-992, Association for Computational Linguistics (11 pages).

Zhu et al., "Computing Semantic Similarity of Concepts in Knowledge Graphs", IEEE Transactions on Knowledge and Data Engineering, 2016, pp. 1-14, vol. 28 (14 pages).

Bordes et al., "Translating Embeddings for Modeling Multi-relational Data", pp. 1-9 (9 pages).

Schumacher et al., "Extraction of Procedural Knowledge from the Web: A Comparison of Two Workflow Extraction Approaches", Apr. 16-20, 2012 (7 pages).

Dufour-Lussier et al., "Semi-Automatic Annotation Process for Procedural Texts: An Application on Cooking Recipes", Sep. 25, 2012, arXiv: 1209.5663v1 (6 pages).

Zhang et al., "Automatically Extracting Procedural Knowledge from Instructional Texts using Natural Language Processing", Proceedings of the Eighth International Conference on Language Resources and Evaluation (LREC'12), 2012, pp. 510-527 (8 pages).

Agarwal et al., "Extracting Procedural Knowledge from Technical Documents", Conference'17, Oct. 20, 2020, arXiv:2010.10156v1 (7 pages).

Halioui et al., "Ontology-Based Workflow Extraction from Texts Using Word Sense Disambiguation", Journal of Information Systems, 2016, pp. 1-27, doi: https://doi.org/10.1101/082784 (27 pages).

Yamakata et al., "English Recipe Flow Graph Corpus", Proceedings of the 12th Conference on Language Resources and Evaluation (LREC 2020), May 11-16, 2020, pp. 5187-5194, European Language Resources Association (8 pages).

Maeta et al., "A Framework for Procedural Text Understanding", Proceedings of the 14th International Conference on Parsing Technologies, Jul. 22-24, 2015, pp. 50-60, Association for Computational Linguistics (11 pages).

Wang et al., "Substructure Similarity Measurement in Chinese Recipes", International World Wide Web Conference, Apr. 21-25, 2008, pp. 979-988 (10 pages).

Sun et al., "Rotate: Knowledge Graph Embedding by Relational Rotation in Complex Space", Conference paper at ICLR, Feb. 26, 2019, pp. 1-18, arXiv:1902.10197v1 (18 pages).

Trouillon et al., "Complex Embeddings for Simple Link Prediction", Proceedings of the 33rd International Conference on Machine Learning, Jun. 20, 2016, vol. 48, arXiv:1606.06357v1 (12 pages).

Kazemi et al., "SimplE Embedding for Link Prediction in Knowledge Graphs", Conference on Neural Information Processing Systems (NIPS 2018), Oct. 26, 2018, pp. 1-12, arXiv:1802.04868v2 (12 pages).

Kipf et al., "Semi-Supervised Classification with Graph Convolutional Networks", Conference paper at ICLR 2017, Feb. 22, 2017, pp. 1-14, arXiv:1609.02907v4 (14 pages).

Hamilton et al., "Inductive Representation Learning on Large Graphs", 31st Conference on Neural Information Processing Systems (NIPS 2017), Sep. 10, 2018, pp. 1-19, arXiv: 1706.02216v4 (19 pages).

RDF "Resource Description Framework", Feb. 25, 2014, Semantic Web Standards, https://www.w3.org/RDF/ (3 pages).

* cited by examiner

FIG. 1

Step 1: In medium size bowl, coarsely mash cranberry sauce
Step 2: Stir in sour cream and horseradish until well blended

Algorithm 1 Flow Graph Output Embedding Calculation

Input A flow graph's output node $v_o$, incoming nodes $I$, incoming edge labels $l$

Output Calculated head vector $h_R \in \mathbb{R}^k$

1: function RECURSIVEAGG(v)
2:     if v.isLeafNode then
3:         return $h_v$
4:     else
5:         inNodes = [RecursiveAgg($v_j$) for $v_j \in I_v$]
6:         return Aggregate(inNodes) + $r_{l_v}$
7:     end if
8: end function
9: function AGGREGATE(EmbeddingList)
10:     return mean(EmbeddingList)
11: end function
12: $h_R$ = Aggregate([RecursiveAgg($v_j$) for $v_j \in I_{v_o}$])

SYSTEM AND METHOD FOR IDENTIFYING SUBSTITUTABLE ENTITIES IN PROCEDURAL INSTRUCTIONS

TECHNICAL FIELD

The present disclosure relates generally to machine learning and in particular to machine learning and processing of procedural instructions.

BACKGROUND

Procedural instructions are a valuable source of information to help people complete tasks. Procedural instructions provide descriptions of how to carry out a set of tasks in order to achieve some goal. Such descriptions are typically displayed in a stepwise fashion in order to break down an overarching task into a series of distinct actions. When performing tasks that are described by procedural instructions, it is sometimes possible to modify the instructions to complete the task in a slightly different way. In the example of cooking, this can be observed when people perform substitutions in the recipe—some ingredients can be substituted with other, similar ingredients such that the outcome of following the recipe remains relatively unchanged. Substitutions might also be performed on the equipment involved in the recipe, or the cooking methods used. However, what substitutions can be made in instructions can be difficult to determine as it requires knowledge of the entities involved with the instructions, the actions taking place, and the outcomes produced by different entities or actions interacting with each other. Gaining a comprehensive understanding about entities and actions involved in procedural instructions is presents a major challenge.

Knowledge Graphs (KG) denote the collection of machine-readable descriptions of interlinked entities including real-world objects, events, situations or abstract concepts. Many AI-based applications rely on KGs to provide background knowledge, human-like concepts and entity awareness to enable a more accurate interpretation of text and speech data. KGs can be expressed using graphs with labeled and directed edges; each node expresses a certain entity, and each labeled and directed edge represents a certain relationship among two different entities. In practice, KGs are often represented using standard formats such as Resource Description Framework (RDF).

A prime example of procedural instructions is a recipe's instructions for cooking a dish. Recipes typically start by specifying a set of ingredients used in the recipe, along with a number of steps describing how to combine and modify those ingredients to form the final dish. While procedural instructions are generally broken down into stepwise chunks, these steps are not necessarily intended to be completed in a single, linear series of actions. For example, some recipes may instruct the user to perform certain tasks in parallel (e.g., "While the mixture is baking in the oven, prepare the garnish . . . "). Some instructions may also specify actions that should have been completed earlier (e.g., "Place the mixture into an oven that has been preheated . . . "). The main task may also be composed of several sub-tasks which are combined together to achieve the main task of the instructions. An example of this situation might be a recipe which serves mashed potatoes together with fried chicken, where each component of the dish has its own distinct tasks and the final product of the sub-tasks—making mashed potatoes and making fried chicken—are combined to form the final dish.

When performing tasks that are described by procedural instructions, it is sometimes possible to modify the instructions to complete the task in a slightly different way. In the example of cooking, this can be observed when people perform substitutions in the recipe—some ingredients can be substituted with other, similar ingredients such that the outcome of following the recipe remains relatively unchanged. Substitutions might also be performed on the equipment involved in the recipe, or the cooking methods used. However, what substitutions can be made in instructions can be difficult to determine as it requires knowledge of the entities involved with the instructions, the actions taking place, and the outcomes produced by different entities or actions interacting with each other. Gaining a comprehensive understanding about entities and actions involved in procedural instructions is presents a major challenge. Natural language text must be parsed to extract entities that occur in the instructions and associate them with the actions that are being performed. Instructions often are not well structured and specific, as they rely on common sense. For example, given the instructions "(1) Pre-heat the pan (2) Fry the eggs", we infer that the instructions are telling us to fry the eggs in the pan that we just preheated. This could also involve reliance on background knowledge that isn't directly available from the instruction text, such as alternative names for similar entities (e.g., 'pan' and 'skillet' are often used interchangeably).

SUMMARY

According to one embodiment, a computer-implemented method for identifying a substitution for an object used in a procedural instruction includes receiving a procedural instruction as input. The procedural instruction including a plurality of steps that identify actions to be performed on objects to attain a result object. The procedural instruction is processed using a natural language processing algorithm to identify object-action tuples pertaining to each of the steps. An overall directed flow graph is then generated that represents the procedural instruction based on the identified object-action tuples. The overall directed flow graph includes a plurality of nodes including leaf nodes that each represent a distinct object to be used in the procedural instruction, each of the leaf nodes having an outgoing edge label extending therefrom that identifies an action to be performed using the object of the associated leaf node, intermediate nodes that each represent an intermediate object used in the procedural instruction, each of the intermediate nodes having an outgoing edge label extending therefrom that identifies an action to be performed using the intermediate object of the associated intermediate node, and a result node that represents the result object of the procedural instruction.

The outgoing edge labels of the leaf nodes and the intermediate nodes each extend to the result node or another one of the intermediate nodes such that the outgoing edge labels correspond to incoming edge labels for the intermediate nodes and the result node to which they are extended. Each of the intermediate nodes and the result node have at least one incoming edge label, each of the incoming edge labels to the respective intermediate nodes and the result node having the same action associated therewith. The leaf nodes and the intermediate nodes correspond to input nodes for the for the intermediate nodes and the result node to which the associated incoming edge labels are extended.

Original embeddings for the intermediate nodes and the result node are then calculated based on triples defined by the overall glow graph, each of the triples including a head entity h, a relation r, and a tail entity t, wherein, for each of the triples the tail entity t corresponds to a respective one of the intermediate nodes and the result node, the relation r corresponds to the action associated with the at least one incoming edge label extended to the respective one of the intermediate nodes and the result node, and the head entity h corresponds to an aggregation of the input nodes associated with the at least one incoming edge labels extended to the respective one of the intermediate nodes and the result node.

A substitution for a first object associated with a first leaf node is then identified by replacing the first leaf node in the overall flow graph with a substitute leaf node representing a different object than the first object, calculating new embeddings for the intermediate nodes and the result node based on the overall flow graph with the substitute leaf node; determining a similarity score between the original embedding for the result node and the new embedding for the result node using a similarity function; and determining whether the substitution is viable based on the similarity score.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

The present disclosure is directed to a method to provide the structure and information necessary to represent procedural instructions and identify viable substitutions. The method involves forming a 'flow graph' of the instructions. A flow graph can represent the instructions as a "rooted" knowledge graphs, with the root node representing the result of following the instructions (e.g., a dish produced by a recipe), leaf nodes capturing the entities used in the instructions (e.g., the ingredients and equipment used in a recipe), and intermediates nodes and edges capturing information about the actions taking place to produce intermediate results (e.g., mixing together flour and water to form a batter). Representing the procedural instructions in this sort of well-structured form can then allow us to further utilize the information to identify what and how modifications can be made to the instructions. In order to form such flow graphs from procedural text, it can also be beneficial to incorporate well-structured, domain-specific information together with the instructions.

Figure 1:
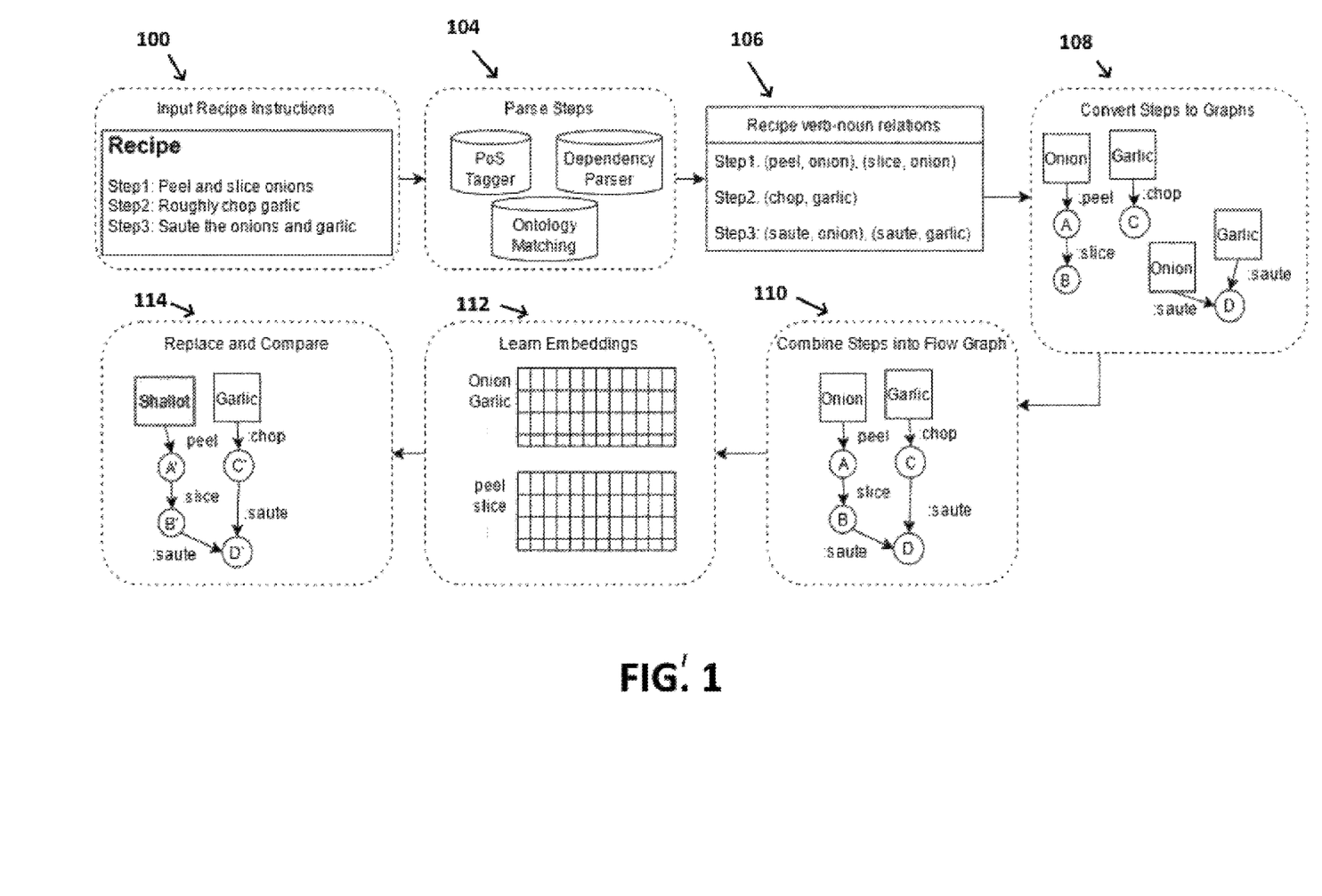
FIG. 1 is an overview of the workflow of a method for identifying substitutions for procedural instructions that includes parsing instruction text, producing flow graphs of the extracted information, learning embeddings for entities and relations, and then performing substitution.

Resources like ontologies or knowledge graphs, which are typically manually curated by domain experts, can provide authoritative knowledge about entities (e.g., 'beef' and 'chicken' are both a type of 'meat'). This knowledge in turn can be useful to inform the process of extracting information from the instruction text as well as augmenting the information available in the resulting flow graph. In this work, we present our approach to extract information from domain-specific procedural instructions—particularly, recipes from the domain of cooking—to convert them from natural language into flow graphs. We then present an approach to learn embeddings for entities and actions that occur in the resulting flow graphs such that we can utilize the embeddings to identify plausible modifications that can be made to the instructions. FIG. 1 shows an overall workflow that begins extracting information from instruction texts to identify plausible modifications.

In the process of FIG. 1, a procedural instruction, in this case a recipe, is received as input (100), the procedural instruction is then parsed to identify objects and actions pertaining to the procedural instruction (104) and identify object-action (noun-verb) relations (106), the identified objects and actions are then used to form step graph for the steps of the instructions (108), and the step graphs are connected to form an overall flow graph for the procedural instruction (110). Embeddings for the objects and actions are then learned and/or calculated (112), and then, based on the embeddings, substitutions for objects (and associated actions) may be identified and compared with the original objects and actions to identify suitable substitutions for the procedural instruction (114). Each of these steps will be explained in more detail below. In one embodiment, the procedural instruction is a recipe. In this embodiment, the objects correspond to ingredients and implements used in the recipe and the actions define what is done with the ingredients and the implements to attain the result object. In an alternative embodiment, the procedural instruction is a construction project. In this alternative embodiment, the objects correspond to materials and tools used in the construction project and the actions define what is done with the materials and tools to attain the result object.

A recipe contains two pieces of information, an ordered list of instructions (or "steps") in natural language, $S_R$, and the set of ingredients used in the recipe, $I_R \cdot S_R S_R = [S_1 | i=1 \ldots n]$ is a list of individual sentences, ordered sequentially as they would appear in the recipe's instructions. Each ingredient $I_i \in I_R$ is a distinct ingredient defined by the recipe, up to m ingredients. Ingredients are assumed to have no order.

One goal is to parse the natural language instructions together with the set of ingredients contained in R to form a directed labeled flow graph $F_R=(V,E)$. The set of nodes $v_i \in V$ may either be a leaf node, if $v_i$ has no incoming edges, an output node if $v_i$ has no outgoing edges, or an intermediate node which has both incoming and outgoing edges. The flow graph must be fully connected and acyclic, so $F_R$ only has one output node. The leaf nodes represent entities that are used as input in the recipe, such as ingredients or equipment. Each edge $<v_i,v_j> \in E>$ represents the flow of node $v_i$ into the intermediate node (or, for the last step in the recipe, the output node). $v_j \in V$ and its label corresponds to the action taking place in the instructions (like "cut" or "mix"). The edges in $F_R$ are constructed such that for a given intermediate node $v_j$, all incoming edges $<v_i,v_j>$ have the same edge label.

A key property of procedural instructions is that the main task of the instructions is the result of using, combining, and transforming a number of distinct inputs. A recipe takes raw ingredients, applies various transformations to them (like cutting or frying), and combines them together to form the final dish. Transformation that are applied may change certain properties about the original inputs (like "diced tomatoes" or "fried onions"), and the instructions provide us with a trace of how such intermediate results that exist in the instructions were formed. As such, it is sensible to consider representing instructions as a "flow" which captures how input items are processed through the instructions in order to achieve a task.

Accordingly, it was decided to parse instruction text and capture its information as a flow graph. Flow graphs are directed rooted graphs whose sink node represents the result of the task (e.g., the recipe's output). Input entities in the instructions, such as raw ingredients or equipment, act as "leaf" nodes in the flow graph, and edges represent actions that are performed to form a new intermediate result.

Figure 2:
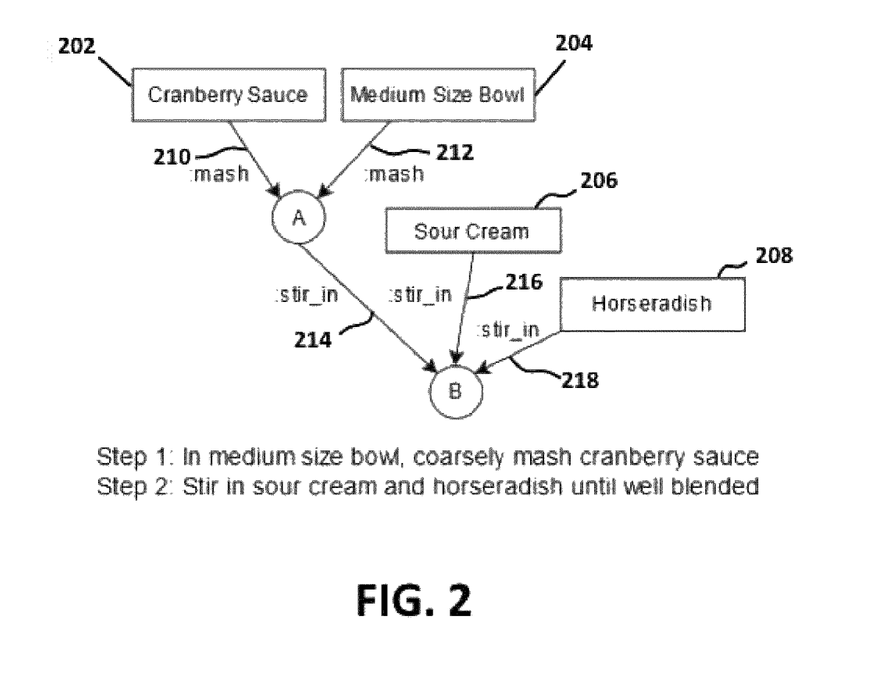
FIG. 2 is an example flow graph for a simple procedural instruction.

FIG. 2 shows an example flow graph of a simple procedural instructions, which following the previous examples is a recipe. In the flow graph of FIG. 2, it can be seen how the leaf nodes 202, 204, 206, 208 corresponding to the raw ingredients used by the recipe have outgoing edges 210, 212, 216, 218 corresponding to the actions that are specified in the recipe. It can also be seen how intermediate results in the recipe are used in subsequent actions, such as how the result of cranberry sauce being mashed in a bowl (labeled here as node A) is participating in the next action of stirring 214, 216, 218 in the other two ingredients to achieve the recipe output (node B). This captures information about how the action of "stir in" is performed using result of mashing the cranberry sauce, which in turn enables more granular details about the flow of processes that are applied through the instructions to be captured.

Please note the omission of some details from the example recipe. In particular, the detail to stir in the ingredients "until well blended" is omitted in the flow graph. For the scope of this work, it was decided to focus on capturing and using core information about actions and entities while dropping additional modifiers about the process (like "coarsely mash") or result. Another point of omission to note is the lack of information about what role each entity plays in an action. For example, the cranberry sauce is being mashed, and the mashing is taking place inside the bowl. In this disclosure, this information is simplified to only capture which entities were involved in the action. Lastly, please note that the flow graph formulation, as well as the aforementioned omissions and simplifications, results in a graph where all incoming edges to a particular node have the same edge label.

Referring to FIG. 1, to construct flow graphs, use is made of common natural language parsing (NLP) tools, such as part-of-speech (PoS) taggers and dependency parsers, as well as ontologies to provide knowledge about domain-specific entities. After extracting relations between entities and actions from each step in the instructions, the steps are combined together to form a flow graph.

Procedural instructions typically have several properties which can be leveraged to aid the information extraction processes. First, many instructions perform actions on or using a set of domain-specific items. In the domain of cooking, this is best exemplified by how recipes specify the ingredients that are used (and, in some cases, the cooking utensils). These key items are often specified ahead of time in the instructions, and this information is invaluable for our parsing efforts to help focus on what actions are taking place in the recipe. Second, instructions are often presented as imperative sentences. In English, the imperative mood (typically used in ordering or commanding that an action take place) is very often (1) in the present tense, and (2) in the second person. While some instruction text may deviate from these properties, knowledge of the general format of procedural instructions, such as recipes, can help to greatly simplify some of the considerations surrounding how to handle the parsed text.

Figure 3:
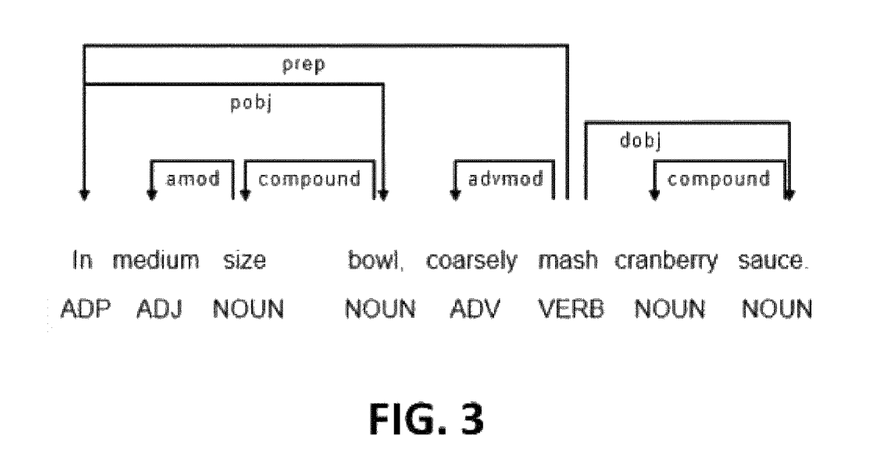
FIG. 3 is an example of a dependency tree produced for a sentence of a procedural instruction.

In parsing instruction text, the first step that is applied is to perform dependency parsing and part-of-speech tagging over each sentence in the recipe's instructions. This is performed to find verbs as well as the nouns that are connected to them. These verbs are the actions of interest that are being specified by the instruction text. At this point, each sentence is processed as if it is independent, and processes like resolving co-references are left for later. In one embodiment, spaCy is used for natural language processing. SpaCy is a Python library with various NLP tools and pretrained language models. An example of the dependency tree that is produced by spaCy can be seen in FIG. 3. Relations like adjectives or modifiers to nouns were simplified such that nouns included all relevant modifiers (e.g., the noun chunk "medium size bowl" is used rather than just ``bowl''). In embodiments, any suitable NLP libraries may be used to process the instruction text including Stanford CoreNLP, API, and the like. Prepositions were discarded as well as adverbs. Additionally, any plural-form nouns were converted into singular-form.

During the parsing process, it was found that the parsers may incorrectly analyze sentences that were particularly terse. For example, recipes often included steps like ``Brown beef in the pot.'' Such sentences had the subject (i.e., the person cooking the recipe) omitted, as is typical with many imperative sentences, and were ambiguous in how they should be parsed (whether to treat ``brown'' as a verb or as an adjective). It was expected that each sentence in the instructions would provide some meaningful action to perform, so in cases where no verb is found, the dependency parse was rerun with an augmented version of the sentence. In practice, it was found that simply adding an explicit subject—like ``you''—to the beginning of the sentence helped to resolve many such cases due to how many imperative sentences do not directly refer to the subject. To follow from the previous example, in practice parsing ``you brown beef in the pot.'' resulted in the expected result (treating ``brown'' as a verb) despite its questionable grammar.

Figure 4:
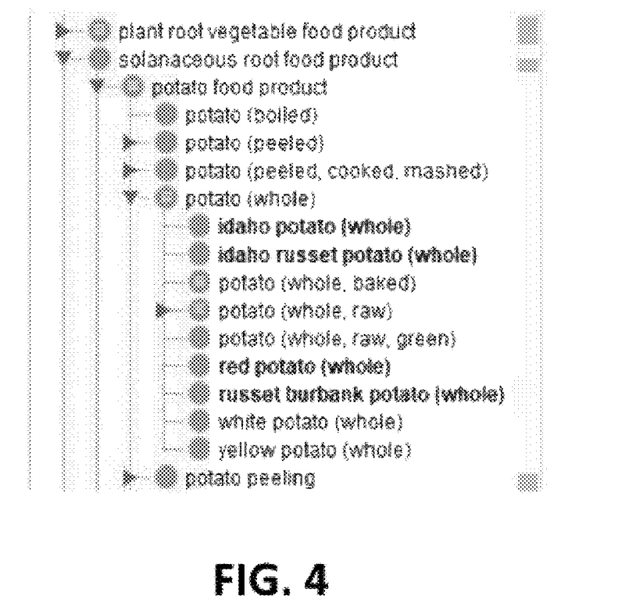
FIG. 4 is a snippet of the class hierarchy of an exemplary ontology, in this case FoodOn.

After processing each step in the recipe, a list of information pertaining to verbs and nouns that are directly interacting with each other in the sentence is provided. For example, from the example sentence in FIG. 3, two tuples of verb-noun relations—(``medium size bowl'', ``mash''), and (``cranberry sauce'', ``mash'')—were extracted. The dependency relation between each verb and noun is retained, for use in forming the flow graph from this information. To further narrow down the results of these parses, ontologies may be used. Ontologies are formal specifications of concepts and their relations. Domain-specific ontologies can provide knowledge about the names of entities or classes of entities for a particular domain, and can also provide insight into alternative names that are used to refer to the same concept. For the domain of cooking, we utilize FoodOn (found at foodon.org), which provides information about thousands of different foods and ingredients as well as their synonyms. An example of a hierarchy between classes, based on their rdfs:subClassOf relations, in FoodOn can be seen in FIG. 4.

Ontologies can be used to help filter out unnecessary information from the parsed instructions by ignoring names of objects that are not found in the domain-specific ontologies of interest. This filtering is performed by matching the parsed nouns to ingredient classes found in FoodOn using various labels, alternative names, and synonyms defined in the ontology. In cases where a sufficiently high-confidence match was not found, we consider the noun to be irrelevant for the task and discard the information.

After parsing instructions (FIG. 1, 104), a list of tuples containing verbs, nouns, and their relations in each step is generated (FIG. 1, 106). A flow graph of the overall recipe is then formed by forming small graphs for the content of each step and then connecting each of these sentences together. To first form minimal graphs from each step, the verb-noun relations that were detected from the dependency parser are used. The verb is used as the edge label to connect the nouns to an output node. In cases where multiple verbs were used in the step, we assume that the noun and intermediate node content in the step are connected sequentially (as they occur in the step's sentence). An example of this step can be seen in FIG. 5.

Figure 5:
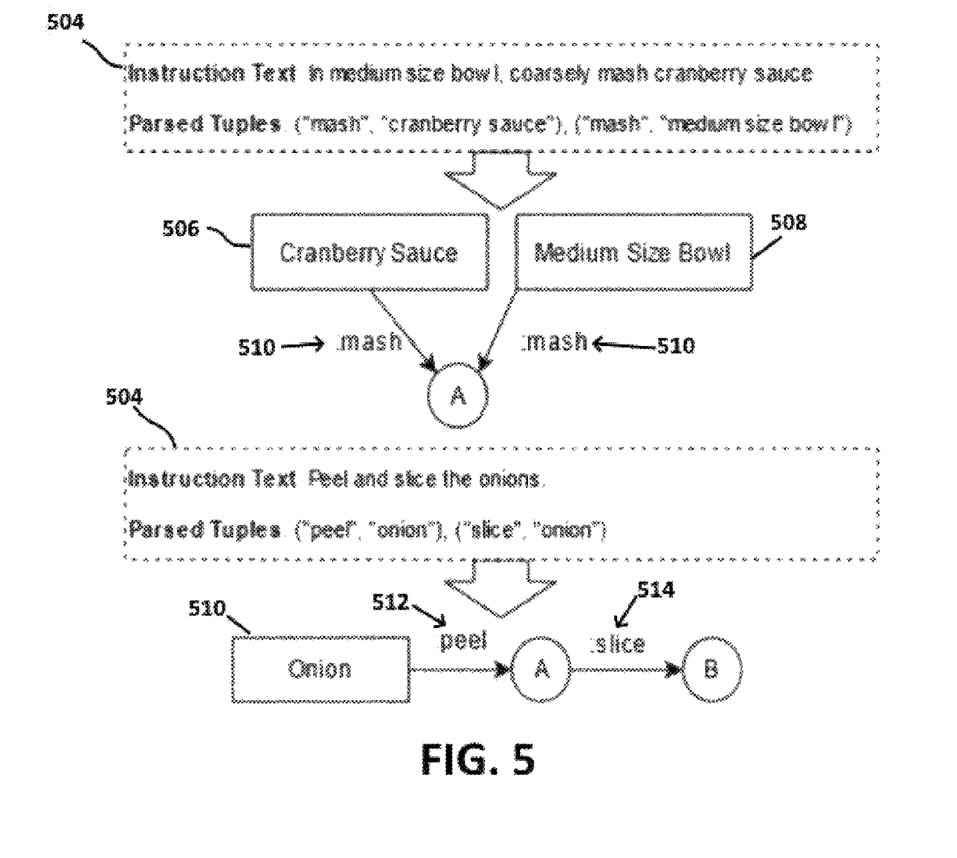
FIG. 5 depicts two examples of converting the parse results for a procedural instruction (e.g. recipe) steps into independent graphs.

As can be seen in FIG. 5, the instruction text 504 is parsed to identify the objects used in the instruction, which in this case are cranberry sauce 506, medium size bowl 508 and onions 510. The objects form leaf nodes for the graphs. The instruction text is also processed to identify actions pertaining to the objects, which in this case are mash 510, peel 512 and slice 514. The actions 510, 512, 514 are used as labels for the edges (arrows) connecting the leaf nodes to nodes A and B. For the first instruction, cranberry sauce 506 and medium size bowl 508 each comprise input nodes to the output node A. The incoming edge labels for node A in the first graph are each labeled "mash". For the second instruction, onion 510 is a leaf node. The outgoing edge from this node is labeled "peel" and extends to a node A. The node A in this instance is used to represent "peeled onions." Node A is connected to node B by an edge that is labeled "slice" indicating that the "peeled onions" are to be sliced.

After minimal graphs are formed for each step in the instructions, the graphs for each step are connected together to form the overall flow graph (FIG. 1, 112). To connect each step, 3 cases are considered: (1) a step includes a reference to an entity that has been used in a previous step; (2) a step's dependency parse includes a verb with no direct subject or object; and (3) a step follows sequentially from the previous step.

Figure 6:
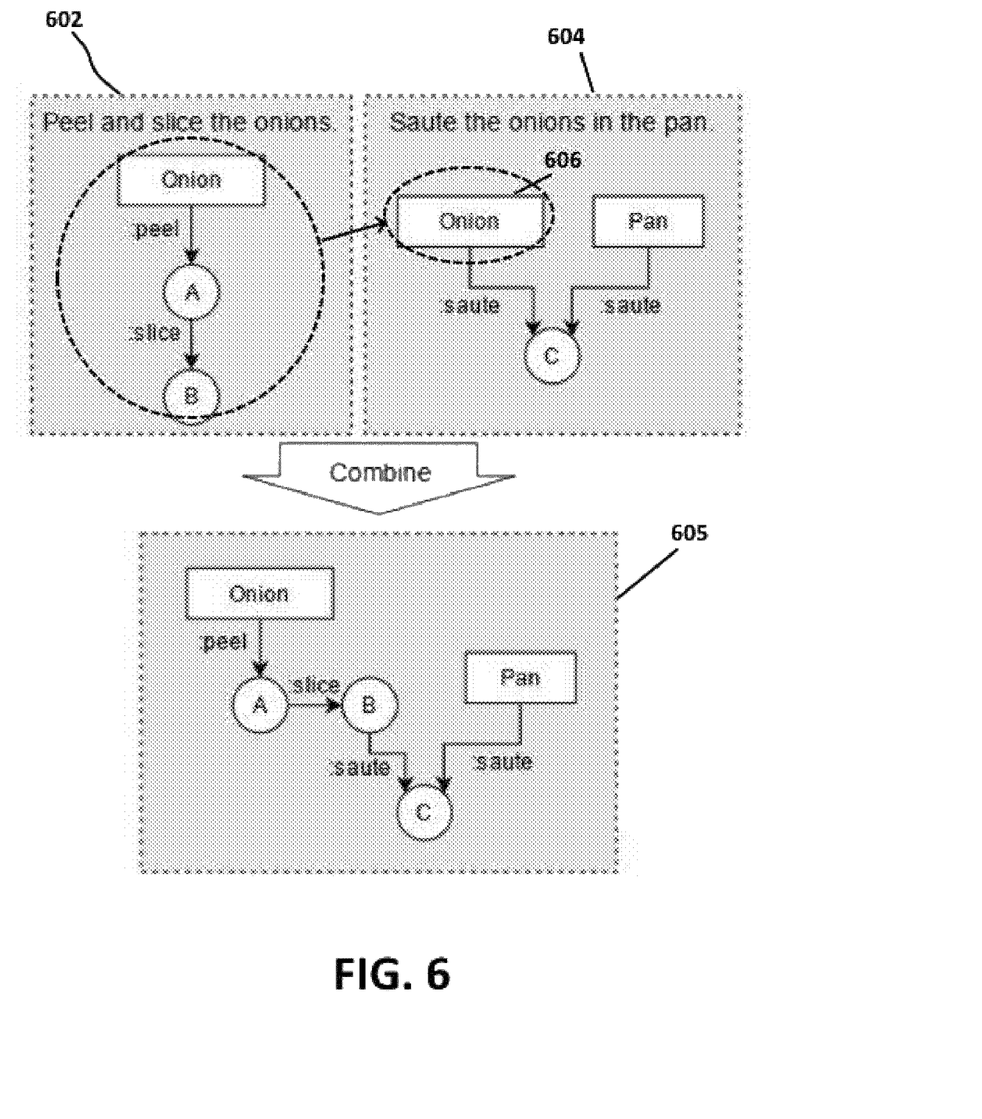
FIG. 6 depicts an example of connecting the graphs for two steps of a procedural instruction to form an overall flow graph.

In the first case, it is checked whether a noun occurs in more than one step to see if the same ingredient is being used. If such a situation exists, the steps are connected together by adding an edge from the output of the earlier step to the first intermediate node in the later step. Each step is checked in order and steps are prioritized that occur earlier in the instructions when adding such connections. An example demonstrating how two steps would be connected in this kind of case can be seen in FIG. 6. FIG. 6 shows the minimal flow graphs for the steps of "peel and slice the onions" (602) and "saute the onions in the pan" (604). As can be seen in the combined graph 605, the leaf node 606 of the second step 604 representing onions is replaced by the graph of the first step 602 which represents the process for processing the onions before step 604.

For the second case in instances where no direct subject or object is found, information from the dependency parse is used. Many modern parsing tools can assign fairly granular relation types for sentences. In cases where no direct subject or object is found, it can be assumed that the verb is acting on the output of the previous step. An example of this situation is two steps like "(1) Chop the onions", "(2) Add to bowl". In the dependency parse result, "Add to bowl" contains no direct subject or object. In this case, it can be inferred that the second step means the onions must be added to the bowl.

If either of the previous two cases do not apply, the steps are simply connected sequentially. In this case, the output node of each step is connected to the first intermediate node in the next step. The edge for this connection copies the same label as other incoming edges for that intermediate node, since it can be assumed that the output of the step is having the same actions applied as other entities in that step. Sequential connections have been shown to be a good baseline for creating flow graphs in the domain of cooking.

Another consideration for a recipe's flow graph is that it is expected to see all of the ingredients specified by the recipe. While this sometimes is trivial, there are often cases where ingredients are referred to by alternate names within the recipe steps or when certain groups of ingredients are referred to (e.g., a step says to "add herbs" rather than individually listing out each herb to add). In cases where not all relevant ingredients from the recipe have been included, leaf nodes in the flow graph are identified that are most similar to the missing ingredients. In embodiments, a measure of semantic similarity, such as wpath, may be used to determine which node is the most similar.

Another thing to consider is that there may be domain-specific special cases for certain phrases, such as "all ingredients" and "remaining ingredients" that occur in recipes that must be accounted for. These phrases occur fairly often in recipes, especially those written by non-experts (e.g., recipes written by community members on cooking websites). These phrases rely on the assumption that all ingredients that occur in the recipe are known ahead of time, and they also rely on sequential knowledge about which ingredients have already been used in the recipe. When either of these cases occur, the flow graph is checked for all instances of ingredients that have been explicitly mentioned. The set of ingredients from the recipe's ingredient list that have not already been added to the flow graph are then taken to be the "remaining" ingredients, and new edges are added for all such ingredients.

Once the overall flow graph has been formed, KG embedding methods are used to model the procedural instruction. A key motivation for using flow graphs is that this enables actions that take place in the instructions to be viewed like transformations on the input nodes. This view is quite similar to many knowledge graphs embedding (KGE) techniques, in which embeddings for entities and relations are learned over triplets of data. Given a triplet (h, r, t), representing the embeddings for a head-entity, relation, and tail-entity, respectively, many KGE methods expect t to be the result of applying some transformation on h based on r. For example, TransE models embeddings such that h+r≈t given h, r, t∈ $\mathbb{R}^k$. In this way, the relation r acts like a transformation on the entity h to produce the result entity t. Connecting this idea to the flow graphs, the actions like "mix" or "cut" are modeled as transformations on the input ingredients to produce output intermediate nodes.

However, formulation of flow graphs described herein may not be suitable for directly applying such KGE methods that are trained over triplets of data because traditional KGE models view each triple independently. In the flow graphs described herein, it is important to consider that all the incoming nodes contribute to the output node. This kind of consideration is not typical for most knowledge graphs, where triples exist to indicate a single factual statement.

Another potential issue that arises when considering the application of KGE methods to the flow graphs described herein is that typical modeling strategies, which rely on having distinct head and tail entity to embed, are unsuitable for the large number of intermediate nodes that exist in the flow graphs. Consider the simple flow graph shown in FIG. 7. Node A acts as an intermediate node, which is the result of applying "mash" to input nodes, while node B is the output of the recipe. Most recipes will contain many intermediate nodes like node A, as at least one new intermediate node is produced by each step in the instructions. Such intermediate nodes would be required in order to feed the data into vanilla KGE models (e.g., with the triplet (cranberry sauce, mash, node A)), but the number of unique intermediate nodes rapidly increases as the number of flow graphs increases. Furthermore, learning embeddings for these intermediate nodes is not required in this disclosure. The embeddings for input nodes, relations, and the recipe output are of interest. The embedding strategy employed herein enables embeddings to be learned without having to explicitly embed the intermediate nodes that occur in each flow graph.

Figure 7:
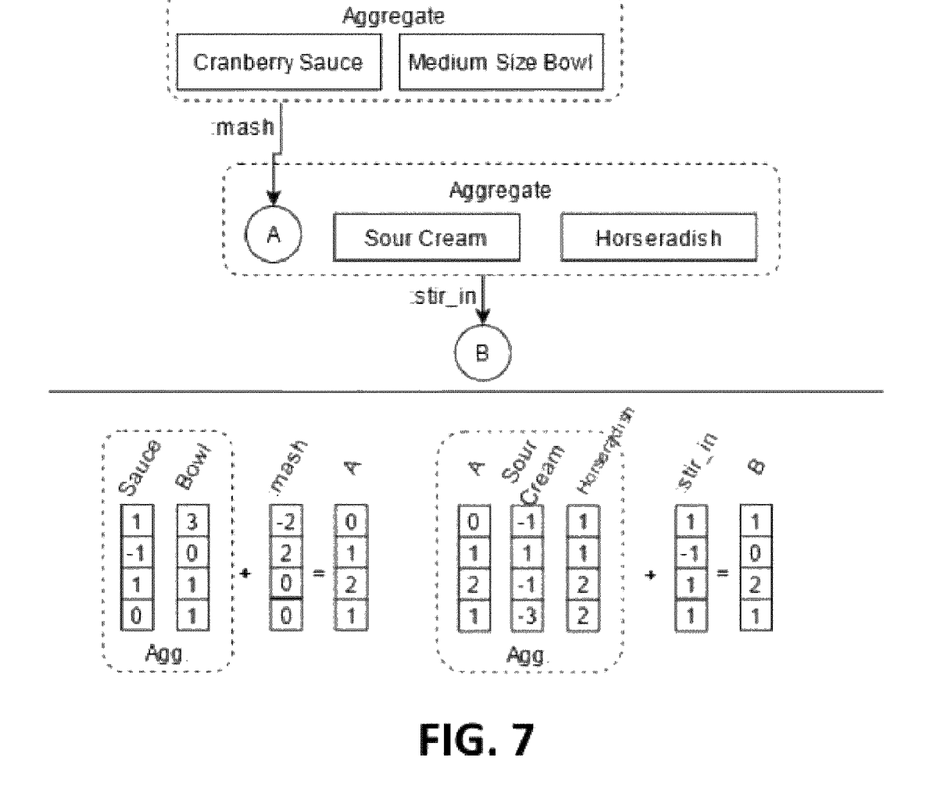
FIG. 7 is an illustration of how aggregation of input nodes to produce an output node is considered in the knowledge graph embedding model in accordance with the present disclosure.

To address the issues posed by using KGE methods on flow graphs of procedural instructions, the present disclosure proposes the idea of performing aggregation on incoming nodes in the flow graph. This aggregation serves to provide additional context when training embeddings, such that all ingredients involved in a procedural instruction, e.g., recipe's, steps are considered while training. Additionally, the issue of handling intermediate nodes is addressed by calculating the output of applying transformations (based on relation embeddings) to entity embeddings during each training step. FIG. 7 provides a visualization of how entity embeddings are aggregated. Leveraging the fact that all incoming edge labels in the flow graphs are the same for a given intermediate node, each aggregation is treated like a single "head" entity in the KGE model's (h, r, t) triplet, and the embeddings for intermediate nodes like node A are calculated on the fly.

More formally, the distance metric used during each training step in our model can be defined in a recursive fashion by defining a "triplet" $(h_R, r_R, t_R)$, where $h_R, r_R, t_R \in \mathbb{R}^k$, for each recipe R. Our goal during training is to minimize the distance $|h_R+r_R-t_R|$, much like how models (like TransE) minimize the distance |h+r−t|. For each leaf node and edge label that exists in a recipe, the node embedding for a particular node v is denoted as $h_v \in \mathbb{R}^k$ and the relation embedding for an edge l is denoted as $r_l \in \mathbb{R}^k$. Given a flow graph $F_R$, let $I_v$ denote the set of nodes with incoming edges to node v and $l_v$ denote the label for incoming edges to node v. Note that in our flow graph formulation, all incoming edges to a given node have the same label. For the flow graph $F_R$ and its output node $v_o$, $H_R$ can be defined as follows:

$$r_R = r_{l_{v_O}}$$

for a given recipe is the last action that takes place in the recipe, and $t_R = h_{v_o}$ is the embedding of the recipe's output node.

Figure 9:
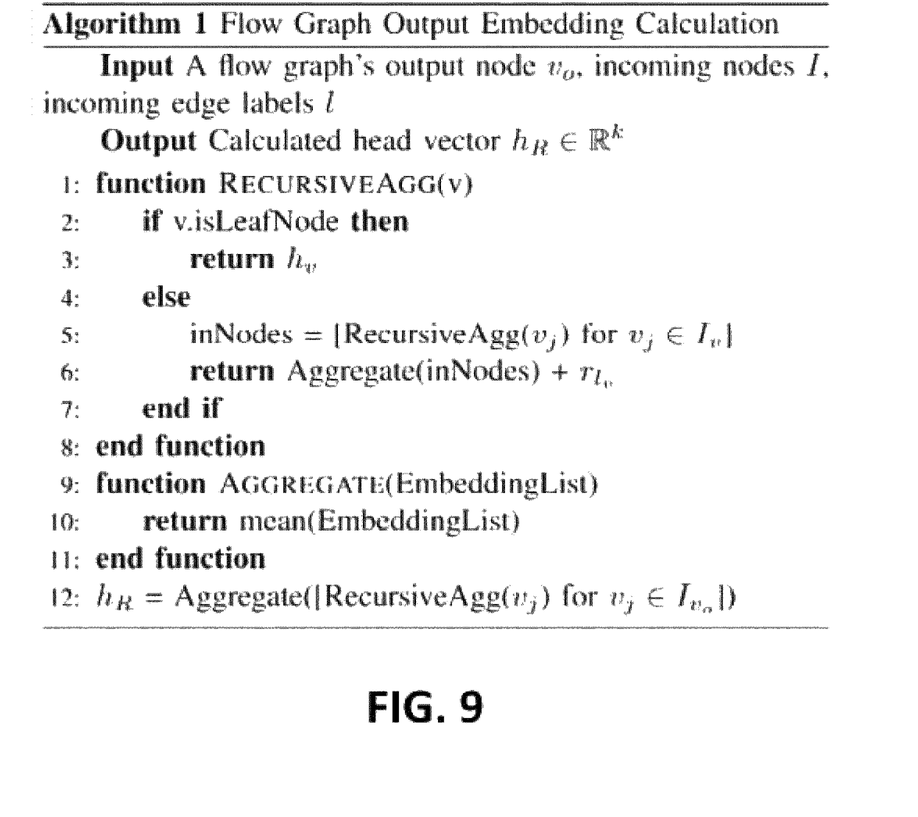
FIG. 9 depicts an algorithm for calculating embeddings for the intermediate node and result node of a flow graph that includes aggregation of input nodes.

An algorithm (Algorithm 1) for calculating embeddings for a flow graph is depicted in FIG. 9. To provide an example of Algorithm 1 applied to a recipe, consider the running example recipe. For this recipe, $v_o$=B, and the incoming nodes $l_{v_o}$=["Sour Cream", "Horseradish", A]. Calling the function RecursiveAgg on "Sour Cream" and "Horseradish" returns the respective embeddings $h_{\text{``Sour Cream''}}$ and $h_{\text{``Horseradish''}}$, both in $\mathbb{R}^k$.

For intermediate node A, an embedding is not explicitly learned—rather, its value is calculated by calling on its incoming nodes, $I_A$=["Cranberry Sauce", "Medium Size Bowl"]. These two nodes are once again leaf nodes, so their respective embeddings are acquired. The incoming edge label $l_A$=":mash", and thus its embedding is $r_{l_A} = r_{\text{``:mash''}} \in \mathbb{R}^k$. RecursiveAgg(A) is thus calculated as mean($[h_{\text{``Cranberry Sauce''}}, h_{\text{``Medium Size Bowl''}}])+r_{\text{``:mash''}}$. This is then further plugged in to the earlier call in the calculation such that:

$$h_R = \text{mean}([\text{RecursiveAgg}(A), h_{\text{``Sour Cream''}}, h_{\text{``Horseradish''}}])$$

Lastly, the incoming edge to $v_o$, ":stir_in", is taken as $r_R = r_{\text{``:stir}_{in}\text{''}} \in \mathbb{R}^k$, and $t_R = h_{v_o} \in \mathbb{R}^k$ to get the recipe's "triplet" $(h_R, r_R, t_R)$ for training. The distance between the recipe's calculated "triplet" $(h_R, r_R, t_R)$ is then calculated as $\text{dist}_R = |h_R + r_R - t_R|$. Following common training procedures for KGE models using this distance metric, the loss function is optimized as $$L_p = -\log \sigma(\gamma - \text{dist}_R)$$

where γ is a fixed margin and σ is the sigmoid function. Another KGE practice for training KGE models that may be utilized include negative sampling. For a given recipe R, a negative sample $t_R' \neq t_R$ is collected, randomly selecting an entity embedding. k negative samples were collected for each training step, and the negative sampling loss was calculated as $$L_n = -\frac{1}{k}\sum_1^k \log \sigma\{(|h_R + r_R - t_R'|) - \gamma\} - \frac{1}{k}\sum_1^k \log \sigma\{(|h_{R'} + r_R - t_R|) - \gamma\}$$

and the total loss is calculated as the sum of the negative and positive loss functions.

$$L = L_p + L_n$$

By using the recursive aggregation strategy, embeddings were able to be calculated for intermediate nodes rather than learning them explicitly. The only nodes in the flow graph data that embeddings were learned for are the ingredient leaf nodes and the recipe's final output node $v_o$. The Aggregate( ) function from the algorithm may have various straightforward implementations that make sense for different KGE models.

In order to incorporate external domain-specific knowledge, training was also performed using triple data from an ontology, such as FoodOn. Since FoodOn's data follows standard modeling that is commonly used in KGE techniques, training may be periodically swapped over between FoodOn triplet data and flow graph data.

It is worth noting that the strategy for training embeddings based on aggregation of entities and relations in flow graphs as described herein may require that training be conducted over one sample at a time. Common batch gradient descent methods rely on samples in the training data to have the same shape (e.g., having the same dimensionality of vectors and applying the same number and type of operations over matrices/vectors). Because flow graphs have variable numbers of relations and leaves, and because intermediate node values are calculated on the fly rather than learning embeddings for each intermediate node, stochastic gradient descent may be performed during learning.

Once entity embeddings and relation embeddings have been trained, the same aggregation techniques used during training, to calculate the recipe "output" embedding and transforming the inputs, can be applied to perform modification and substitution of entities in a recipe.

Given a recipe's flow graph $F_R$, the KGE model will have learned an embedding for the recipe's final output, $h_{v_o}$. Additionally, the entity and relation embeddings for the nodes and edges in $F_R$ can be used to calculate the recipe's output as well (once again following from the intuition that the embeddings $h_R + r_R \approx t_R$). The original recipe's learned output node embedding, $h_{v_o}$, and the calculated output embedding of the original recipe's flow graph, $t_R$, can be used to identify plausible substitutions of ingredients by replacing nodes in $F_R$, and calculating a new output embedding.

Given a node v in the flow graph $F_R$ ($v \in F_R$) that is desired to be substitutes with another node (e.g., an ingredient to replace with a different ingredient), the node v can be replaced with a new node $v_s$. All of the edges in the flow graph $F_R$ to which v was connected are also replaced depending on the actions that may be required for the new ingredient. Then, following the procedure from Algorithm 1, a new output embedding is calculated for the flow graph with a node substitution as $t_{R'}$. To determine whether the substitution seems plausible or not, a similarity function may be used to determine a similarity between the newly calculated embedding $t_{R'}$, with the original learned embedding $h_{v_o}$ and the original calculated embedding $t_R$.

Figure 8:
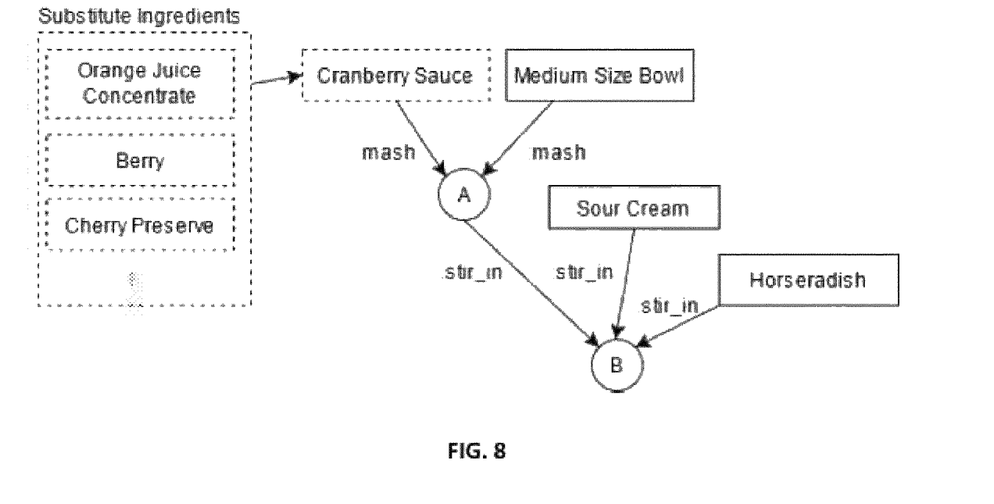
FIG. 8 is an illustration demonstrating how substitutes are considered with respect to the flow graph for the procedural instruction.

An example of visualizing this sort of substitution is shown in FIG. 8. To find a good substitution for $\mathbb{R}^k$ "Cranberry Sauce" in this recipe, the target node is replaced in the recipe's flow graph with a substitute ingredient node. This modified flow graph, $F_{R'}$, can then be fed through Algorithm 1 to compute $h_{R'}$, and subsequently calculate $t_{R'} = h_{R'} + r_{v_o}$, similarly, to how the original recipe's output is calculated as $t_R = h_R + r_{v_o}$. A similarity function, such as cosine similarity, is then used to calculate a similarity between $t_R$ and $t_{R'}$ for each substitute ingredient. The substitutions can then be ranked based on the computed similarity. Any suitable similarity function may be used to determine a similarity metric for rating or scoring the substitutions, such as Jaccard similarity, Pearson's Correlation, and the like.

Figure 10:
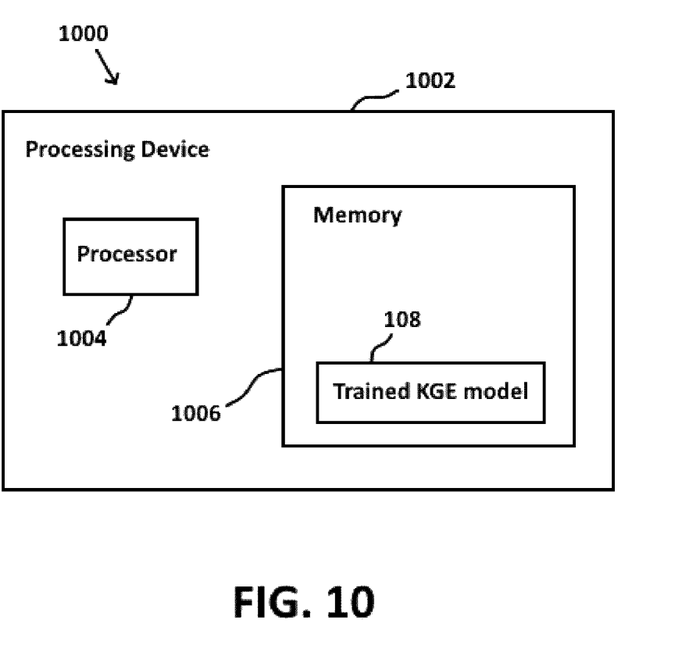
FIG. 10 is a schematic illustration of a system for performing the method for identifying substitutions for procedural instructions of FIG. 1

FIG. 10 shows an exemplary system 100 for implementing the methods described herein for identifying substitutions for procedural instructions. The system includes a processing device 1002 having a processor 1004 and a memory 1006.

The processor 1004 is configured to execute instructions to perform the various steps of the method. To this end, the processor 1004 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 710 may include a system with a central processing unit, graphics processing units, multiple processing units, dedicated circuitry for achieving functionality, programmable logic, or other processing systems.

The memory 1006 is configured to store data and program instructions that, when executed by the processor 1004, enable the system 1000 to perform various operations described herein. The memory 1004 may be of any type of device capable of storing information accessible by the processor 1004, such as a memory card, ROM, RAM, hard drives, discs, flash memory, or any of various other computer-readable medium serving as data storage devices, as will be recognized by those of ordinary skill in the art. In at least one embodiment, the memory 1006 stores the trained knowledge graph embedding model 1008.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A computer-implemented method for identifying a substitution for an object used in a procedural instruction, the method comprising:
   receiving a procedural instruction as input, the procedural instruction including a plurality of steps that identify actions to be performed on objects to attain a result object;
   processing the procedural instruction using a natural language processing algorithm to identify object-action tuples pertaining to each of the steps;
   generating an overall directed flow graph that represents the procedural instruction based on the identified object-action tuples, the overall directed flow graph including a plurality of nodes, the plurality of nodes including:
      leaf nodes that each represent a distinct object to be used in the procedural instruction, each of the leaf nodes having an outgoing edge label extending therefrom that identifies an action to be performed using the object associated with the leaf node,
      intermediate nodes that each represent an intermediate object used in the procedural instruction, each of the intermediate nodes having an outgoing edge label extending therefrom that identifies an action to be performed using the intermediate object associated with the intermediate node, and
      a result node that represents the result object of the procedural instruction;
      wherein the outgoing edge labels of the leaf nodes and the intermediate nodes each extend to the result node or another one of the intermediate nodes such that the outgoing edge labels correspond to incoming edge labels for the intermediate nodes and the result node to which they are extended, each of the intermediate nodes and the result node having at least one incoming edge label, each of the incoming edge labels to the respective intermediate nodes and the result node having a same action associated therewith, and
      wherein the leaf nodes and the intermediate nodes correspond to input nodes for the intermediate nodes and the result node to which the associated incoming edge labels are extended,
   calculating original embeddings for the intermediate nodes and the result node based on triples defined by the overall directed flow graph, each of the triples including a head entity h, a relation r, and a tail entity t, wherein, for each of the triples:
      the tail entity t corresponds to a respective one of the intermediate nodes and the result node,
      the relation r corresponds to the action associated with the at least one incoming edge label extended to the respective one of the intermediate nodes and the result node,
      the head entity h corresponds to an aggregation of the input nodes associated with the at least one incoming edge labels extended to the respective one of the intermediate nodes and the result node,
   identifying a substitution for a first object associated with a first leaf node by:
      replacing the first leaf node in the overall directed flow graph with a substitute leaf node representing a different object than the first object;
      calculating new embeddings for the intermediate nodes and the result node based on the overall directed flow graph with the substitute leaf node; and
      determining a similarity score between the original embedding for the result node and the new embedding for the result node using a similarity function; and
   determining whether the substitution is viable based on the similarity score.

2. The computer-implemented method of claim 1, wherein the generation of the overall directed flow graph further comprises:
   generating a minimal flow graph for each of the steps of the procedural instruction; and
   connecting the minimal flow graphs to form the overall directed flow graph for the procedural instruction.

3. The computer-implemented method of claim 1, wherein the processing of the procedural instruction using the natural language processing algorithm to identify the object-action tuples further comprises:
   using an ontology specific to a domain to identify the object-action tuples.

4. The computer-implemented method of claim 1, wherein the calculation of the original embeddings and the new embeddings for the intermediate nodes and the result node further comprises:
   calculating a distance metric for the original embeddings and the new embeddings such that h+t=r.

5. The computer-implemented method of claim 1, wherein the similarity function is one of a cosine similarity function, a Jaccard similarity function and a Pearson's Correlation function.

6. The computer-implemented method of claim 1, wherein the procedural instruction is a recipe, the objects correspond to ingredients and implements used in the recipe, and the actions define what is done with the ingredients and the implements to attain the result object.

7. The computer-implemented method of claim 1, wherein the procedural instruction is a construction project, the objects correspond to materials and tools used in the construction project, and the actions define what is done with the materials and tools to attain the result object.

8. The computer-implemented method of claim 1, wherein the embeddings are calculated based on a knowledge graph embedding model.

9. A system for identifying a substitution for an object used in a procedural instruction, the system comprising:
   a processing device including a processor and memory;
   programmed instructions stored on the memory for execution by the processor, the programmed instructions being configured to enable the processor to:
      receive a procedural instruction as input, the procedural instruction including a plurality of steps that identify actions to be performed on objects to attain a result object;
      process the procedural instruction using a natural language processing algorithm to identify object-action tuples pertaining to each of the steps;
      generate an overall directed flow graph that represents the procedural instruction based on the identified object-action tuples, the overall directed flow graph including a plurality of nodes, the plurality of nodes including:

intermediate leaf nodes that each represent a distinct object to be used in the procedural instruction, each of the leaf nodes having an outgoing edge label extending therefrom that identifies an action to be performed using the object associated with of the leaf node, intermediate nodes that each represent an intermediate object used in the procedural instruction, each of the intermediate nodes having an outgoing edge label extending therefrom that identifies an action to be performed using the intermediate object associated with the intermediate node, and a result node that represents the result object of the procedural instruction;

wherein the outgoing edge labels of the leaf nodes and the intermediate nodes each extend to the result node or another one of the intermediate nodes such that the outgoing edge labels correspond to incoming edge labels for the intermediate nodes and the result node to which they are extended, each of the intermediate nodes and the result node having at least one incoming edge label, each of the incoming edge labels to the respective intermediate nodes and the result node having a same action associated therewith, and wherein the leaf nodes and the intermediate nodes correspond to input nodes for the intermediate nodes and the result node to which the associated incoming edge labels are extended, calculate original embeddings for the intermediate nodes and the result node based on triples defined by the overall directed flow graph, each of the triples including a head entity h, a relation r, and a tail entity t, wherein, for each of the triples:

the tail entity t corresponds to a respective one of the intermediate nodes and the result node, the relation r corresponds to the action associated with the at least one incoming edge label extended to the respective one of the intermediate nodes and the result node, the head entity h corresponds to an aggregation of the input nodes associated with the at least one incoming edge labels;

identify a substitution for a first object associated with a first leaf node by:

replacing the first leaf node in the overall directed flow graph with a substitute leaf node representing a different object than the first object;

calculating new embeddings for the intermediate nodes and the result node based on the overall directed flow graph with the substitute leaf node; and determining a similarity score between the original embedding for the result node and the new embedding for the result node using a similarity function; and determining whether the substitution is viable based on the similarity score.

* * * * *